United States Patent
Blazer et al.

(10) Patent No.: US 9,513,449 B2
(45) Date of Patent: Dec. 6, 2016

(54) OPTICAL FIBER CABLE WITH PROTECTIVE TRANSLUCENT OUTER LAYER

(71) Applicant: Corning Cable Systems LLC, Hickory, NC (US)

(72) Inventors: Bradley Jerome Blazer, Granite Falls, NC (US); David Wesley Chiasson, Edmonton (CA); Scott Allen McDowell, Connelly Springs, NC (US); Reginald Roberts, Taylorsville, NC (US); David Henry Smith, Hickory, NC (US); Randall Dwaine Tuttle, Conover, NC (US)

(73) Assignee: CORNING CABLE SYSTEMS LLC, Hickory, NC (US)

(*) Notice: Subject to any disclaimer, the term of this patent is extended or adjusted under 35 U.S.C. 154(b) by 0 days.

(21) Appl. No.: 14/099,919

(22) Filed: Dec. 7, 2013

(65) Prior Publication Data
US 2015/0023640 A1  Jan. 22, 2015

Related U.S. Application Data

(60) Provisional application No. 61/856,113, filed on Jul. 19, 2013.

(51) Int. Cl.
*G02B 6/44* (2006.01)
*H01B 7/36* (2006.01)

(52) U.S. Cl.
CPC ............ *G02B 6/443* (2013.01); *G02B 6/4482* (2013.01); *H01B 7/365* (2013.01)

(58) Field of Classification Search
CPC ........ G02B 6/4482; G02B 6/443; H01B 7/365
(Continued)

(56) References Cited

U.S. PATENT DOCUMENTS 3,273,498 A * 9/1966 Martin .................... B41M 1/30
101/35
4,997,994 A * 3/1991 Andrews ................ B41M 5/267
174/112

(Continued)

FOREIGN PATENT DOCUMENTS

CH  DE 102007049374 A1 * 4/2009  ............. G02B 6/447
DE     102007049374 A1   4/2009
(Continued)

OTHER PUBLICATIONS

Fluoropolymer Technical Spec Sheet, "Spec Sheet" available at http://www2.dupont.com/Teflon_Industrial/en_US/tech_info/techinfo_compare.html.*

(Continued)

*Primary Examiner* — Peter Radkowski
(74) *Attorney, Agent, or Firm* — William D. Doyle

(57) ABSTRACT

An optical communication cable is provided. The optical communications cable includes a cable body having an outer surface, an inner surface and a channel defined by the inner surface. An optical transmission element is located in the channel. The cable includes an ink layer positioned on the outer surface of the cable body, and the ink layer is formed from charged ink droplets adhered to the outer surface of the cable body. The cable also includes a translucent layer coupled to the outer surface of the cable body over the ink layer such that the ink layer is located between the outer surface of the cable body and an inner surface of the translucent layer.

20 Claims, 5 Drawing Sheets

(58) Field of Classification Search
USPC .................................... 385/100; 439/488
See application file for complete search history.

(56) References Cited

U.S. PATENT DOCUMENTS

| | | | | |
|---|---|---|---|---|
| 5,042,904 | A * | 8/1991 | Story | G02B 6/4416 174/107 |
| 5,060,697 | A * | 10/1991 | Weinheimer | B29C 47/0023 138/111 |
| 5,179,619 | A * | 1/1993 | Bosisio | C03C 25/106 385/128 |
| 5,485,539 | A * | 1/1996 | Mills | G02B 6/4482 347/4 |
| 5,809,194 | A * | 9/1998 | Lovie | 385/104 |
| 5,857,714 | A * | 1/1999 | Gustafson | E21B 17/028 166/65.1 |
| 5,917,978 | A * | 6/1999 | Rutterman | G02B 6/443 385/109 |
| 6,064,789 | A * | 5/2000 | Mills | G02B 6/4482 385/100 |
| 6,236,789 | B1 * | 5/2001 | Fitz | G02B 6/4416 385/100 |
| 6,293,081 | B1 * | 9/2001 | Grulick et al. | 57/293 |
| 6,404,972 | B1 * | 6/2002 | Pasch | G02B 6/4482 385/123 |
| 6,473,548 | B2 * | 10/2002 | Nagayama | C03B 37/0253 385/100 |
| 6,560,390 | B2 * | 5/2003 | Grulick et al. | 385/100 |
| 6,621,965 | B2 * | 9/2003 | Seddon | G02B 6/4484 385/104 |
| 6,661,956 | B2 * | 12/2003 | Yamasaki | G02B 6/4482 385/109 |
| 6,731,844 | B2 * | 5/2004 | Conrad | G02B 6/4482 385/114 |
| 6,748,147 | B2 * | 6/2004 | Quinn | G02B 6/4408 385/110 |
| 6,758,067 | B2 * | 7/2004 | Ganan-Calvo | C03B 37/023 65/401 |
| 7,072,554 | B2 * | 7/2006 | Watanabe | G02B 6/4482 385/100 |
| 7,391,943 | B2 * | 6/2008 | Blazer et al. | 385/100 |
| 7,764,855 | B2 * | 7/2010 | Roba | C03C 25/106 385/128 |
| 8,023,786 | B2 * | 9/2011 | Lapp | H01B 7/368 174/70 R |
| 8,164,420 | B2 * | 4/2012 | Doan | G06K 19/0716 340/10.1 |
| 8,247,063 | B2 * | 8/2012 | Holbert | B32B 7/06 428/195.1 |
| 8,629,774 | B2 * | 1/2014 | Lapp | H02G 3/0462 340/10.51 |
| 2001/0002943 | A1 * | 6/2001 | Nagayama | C03B 37/0253 385/100 |
| 2001/0037663 | A1 * | 11/2001 | Ganan-Calvo | C03B 37/023 65/401 |
| 2002/0009282 | A1 * | 1/2002 | Grulick et al. | 385/147 |
| 2003/0012530 | A1 * | 1/2003 | Yamasaki | G02B 6/4482 385/109 |
| 2003/0016923 | A1 * | 1/2003 | Summers et al. | 385/100 |
| 2003/0118300 | A1 * | 6/2003 | Seddon | G02B 6/4413 385/111 |
| 2004/0028366 | A1 * | 2/2004 | Watanabe | G02B 6/4482 385/128 |
| 2004/0057681 | A1 * | 3/2004 | Quinn | G02B 6/4408 385/110 |
| 2005/0109522 | A1 * | 5/2005 | Ysbrand | H01B 1/22 174/36 |
| 2005/0143492 | A1 * | 6/2005 | Kasai | C09D 11/30 523/160 |
| 2006/0269198 | A1 * | 11/2006 | Blazer et al. | 385/100 |
| 2007/0263972 | A1 * | 11/2007 | Roba | C03C 25/106 385/128 |
| 2008/0000387 | A1 * | 1/2008 | Renner | C09D 11/328 106/31.59 |
| 2010/0052909 | A1 * | 3/2010 | Doan | G06K 19/0716 340/572.1 |
| 2010/0142902 | A1 * | 6/2010 | Lapp | H01B 7/368 385/101 |
| 2010/0147583 | A1 * | 6/2010 | Lapp | H01B 7/368 174/70 R |
| 2010/0158454 | A1 * | 6/2010 | Lapp | H01B 7/368 385/101 |
| 2010/0165557 | A1 * | 7/2010 | Lapp | H02G 3/0616 361/679.01 |
| 2010/0166374 | A1 * | 7/2010 | Lapp | H01B 7/366 385/101 |
| 2010/0172618 | A1 * | 7/2010 | Lapp | H01B 7/32 385/101 |
| 2011/0025468 | A1 * | 2/2011 | Longhurst | G01V 15/00 340/10.1 |

FOREIGN PATENT DOCUMENTS

| | | | |
|---|---|---|---|
| JP | 0943465 A | 2/1997 | |
| JP | 9043465 A | 2/1997 | |
| JP | 09043465 A * | 2/1997 | |
| JP | 2003050340 A * | 2/2003 | |
| WO | WO2005/001537 A1 | 1/2005 | G02B 6/44 |

OTHER PUBLICATIONS

Patent Cooperation Treaty, International Search Report, PCT/US2014/046588, Mail date Oct. 2, 2014, 11 pages.

* cited by examiner

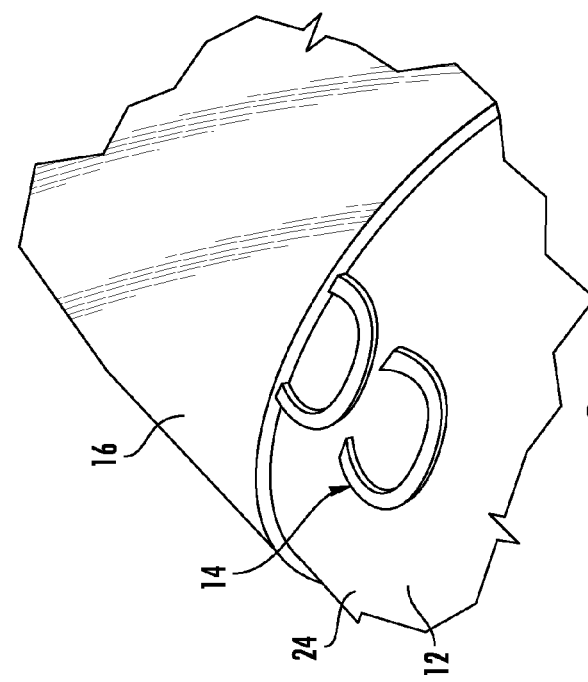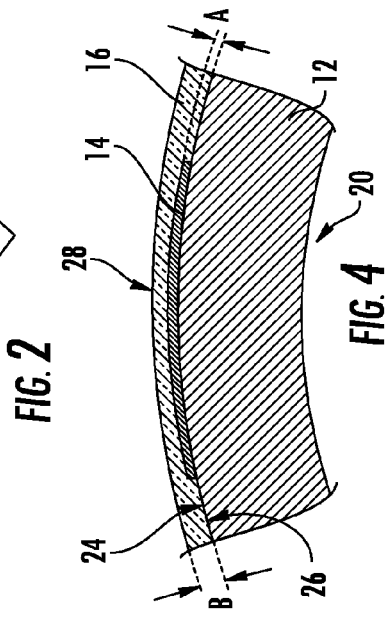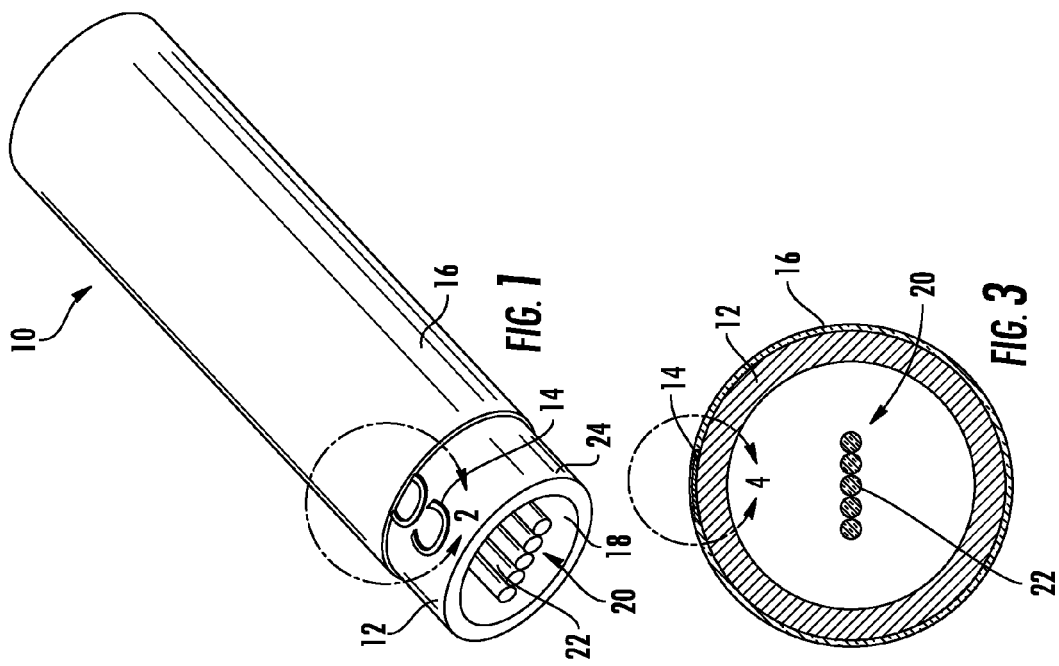

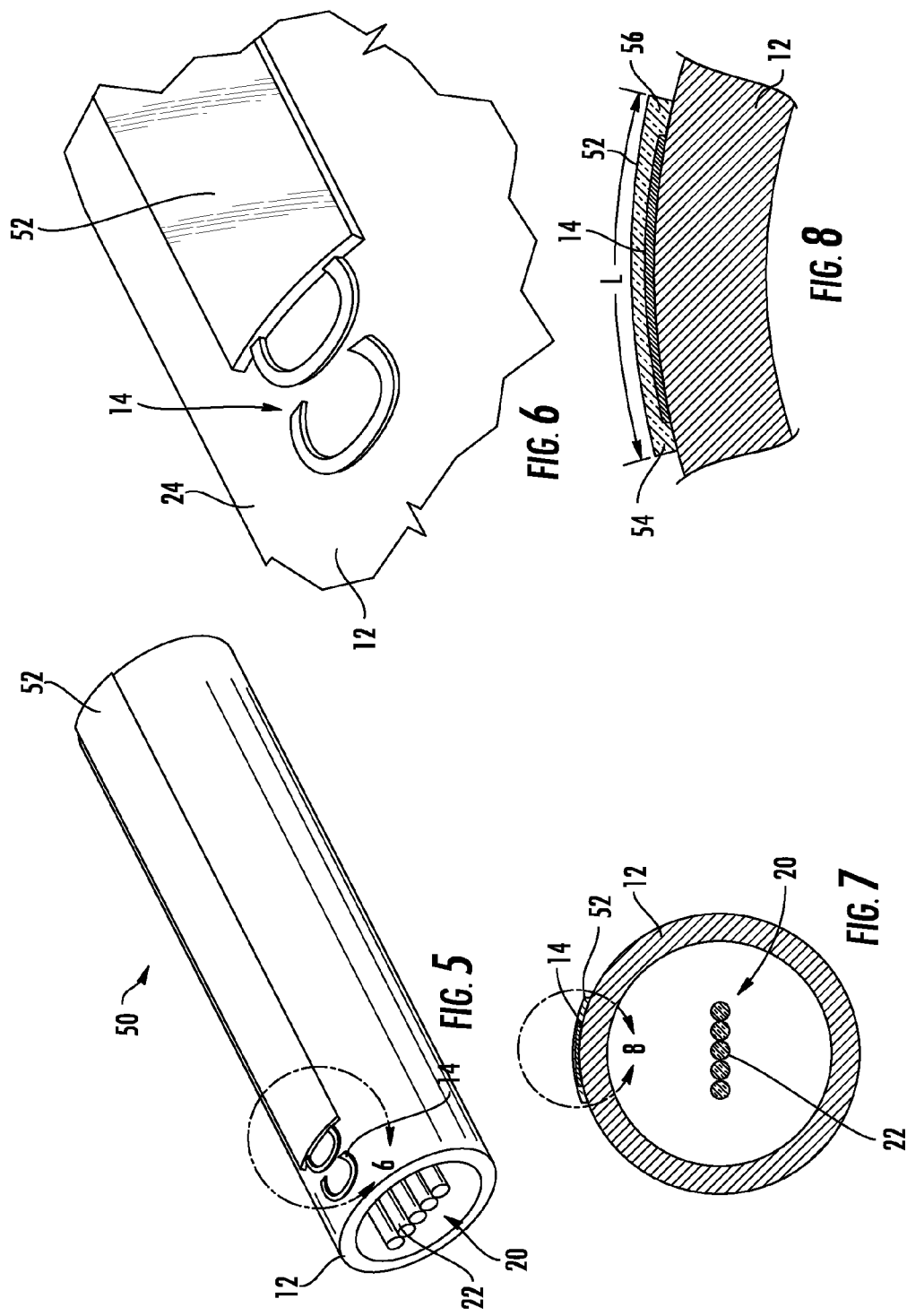

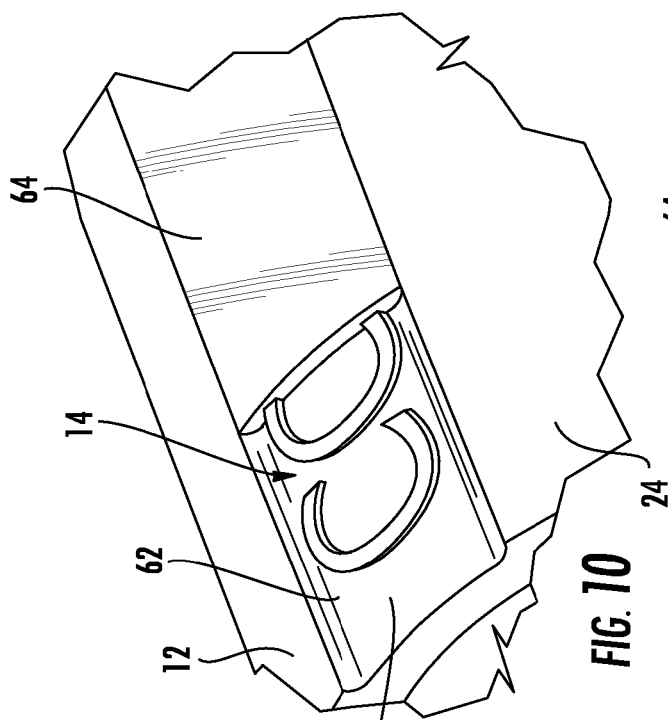
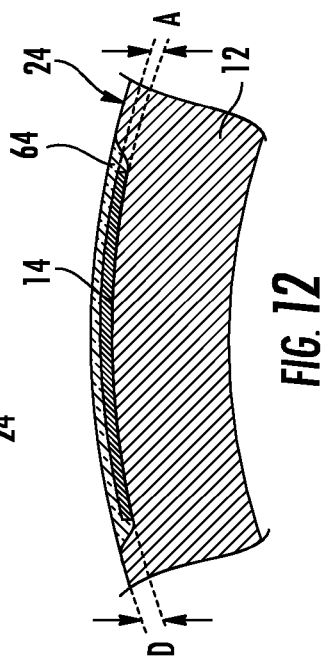
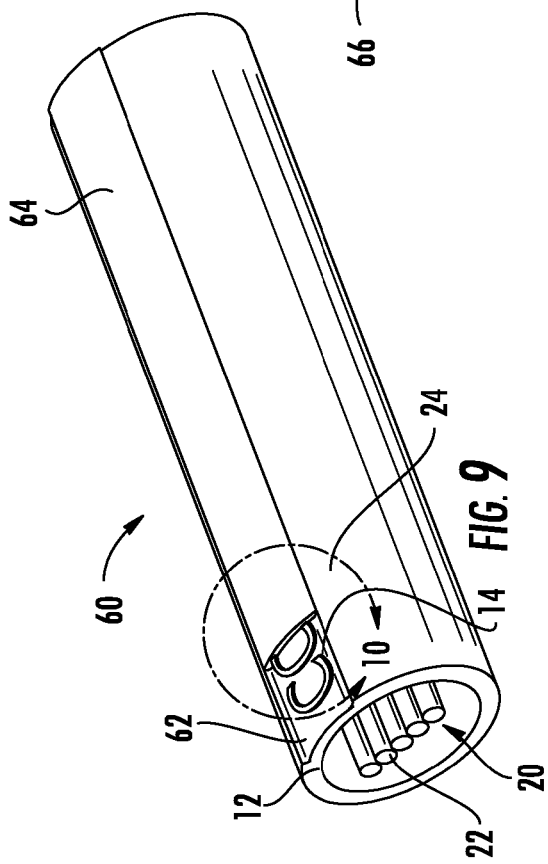
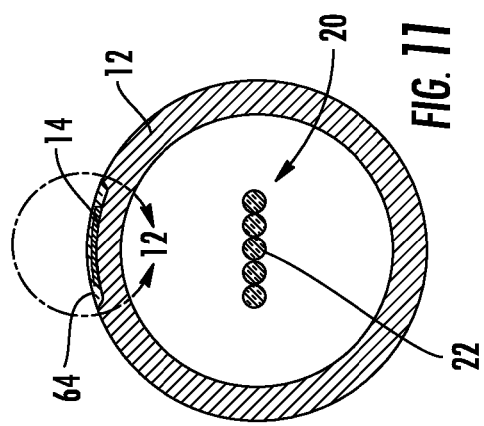

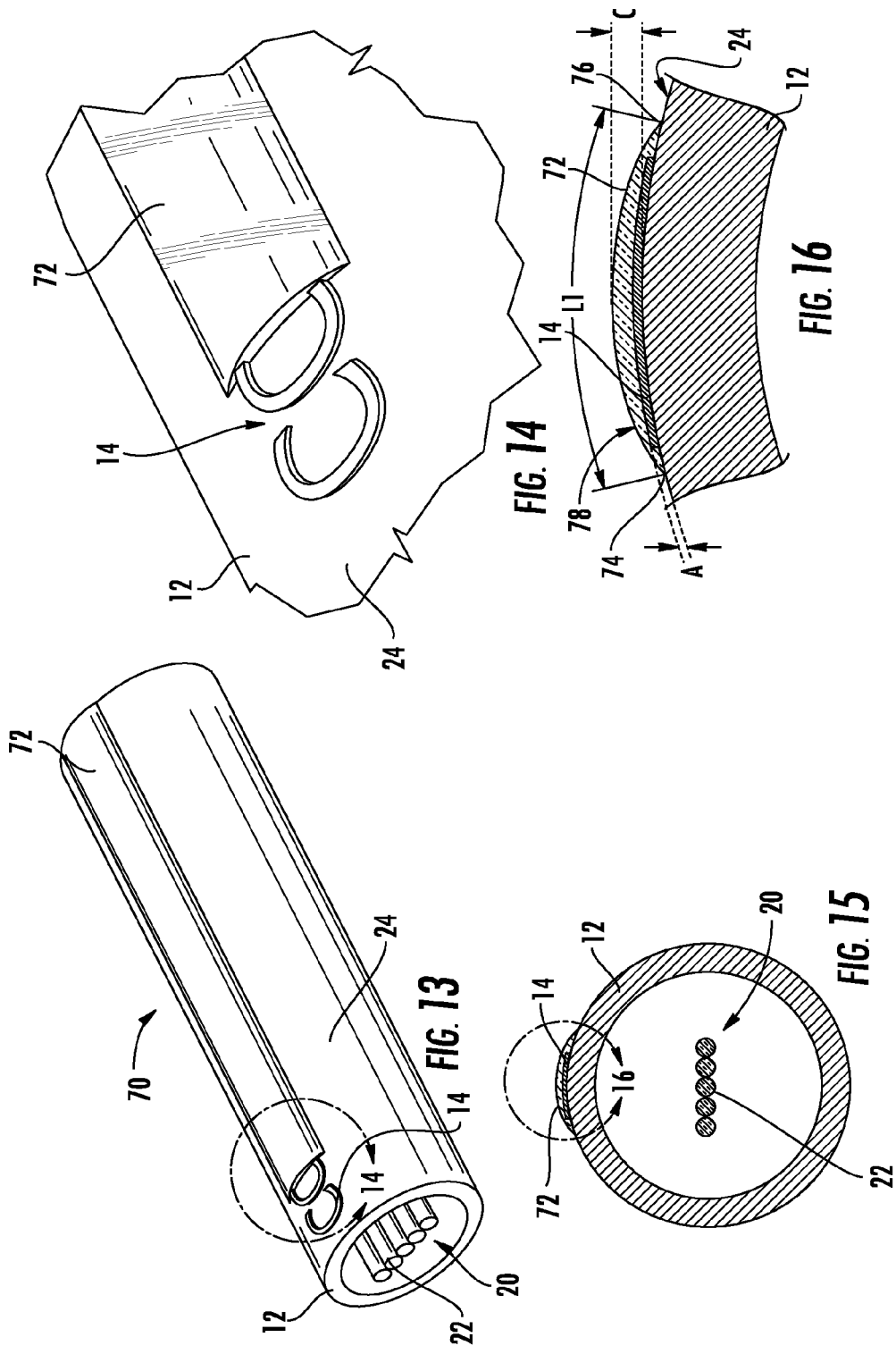

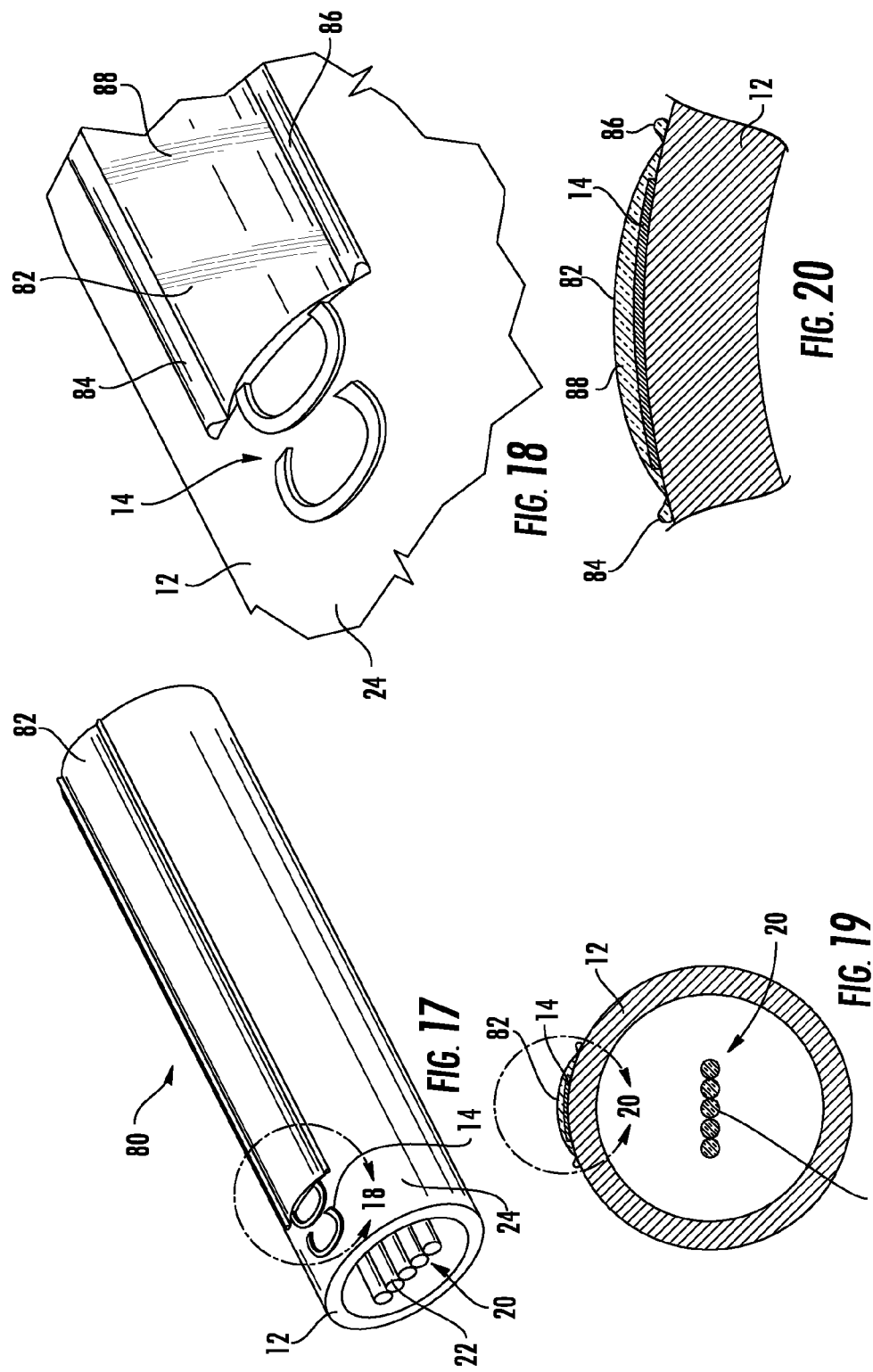

OPTICAL FIBER CABLE WITH PROTECTIVE TRANSLUCENT OUTER LAYER

RELATED APPLICATIONS

This application claims the benefit of priority under 35 U.S.C. §119 of U.S. Provisional Application Ser. No. 61/856,113 filed on Jul. 19, 2013, the content of which is relied upon and incorporated herein by reference in its entirety.

BACKGROUND

The disclosure relates generally to optical communication cables and more particularly to optical communication cables including a protective outer layer. Optical communication cables have seen increased use in a wide variety of electronics and telecommunications fields. Optical communication cables may contain or surround one or more optical communication fibers. The cable provides structure and protection for the optical fibers within the cable.

SUMMARY

One embodiment of the disclosure relates to an optical communication cable. The optical communications cable includes a cable body having an outer surface, an inner surface and a channel defined by the inner surface. An optical transmission element is located in the channel. The cable includes an ink layer positioned on the outer surface of the cable body, and the ink layer is formed from charged ink droplets adhered to the outer surface of the cable body. The cable also includes a translucent layer coupled to the outer surface of the cable body over the ink layer such that the ink layer is located between the outer surface of the cable body and an inner surface of the translucent layer.

An additional embodiment of the disclosure relates to an optical cable including a cable body having an outer surface. The cable includes an optical transmission element located within the cable body, and the optical transmission element includes an optical core, a cladding layer surrounding the optical core and an outer protective layer surrounding the optical core and the cladding layer. The cable includes an indicia layer positioned on the outer surface of the cable body and a translucent outer layer coupled to the outer surface of the cable body over the indicia layer. The translucent outer layer includes an inner surface directly contacting the outer surface of the cable body and the translucent outer layer is bonded to the outer surface of the cable body via a bond between the material of the cable body and the material of the translucent outer layer at the interface between the outer surface of the cable body and the inner surface of the translucent outer layer. The indicia layer is located between the cable body and the translucent outer layer. The durometer of the material of the translucent outer layer is greater than or equal to the durometer of the material of the cable body.

An additional embodiment of the disclosure relates to an optical fiber cable. The optical fiber cable including a cable body having an outer surface, an inner surface, a first end, a second end opposite the first end and a lumen defined by the inner surface extending between the first end and the second end. The cable includes a plurality of optical fibers in the lumen, and each optical fiber has an optical core, a cladding layer surrounding the optical core and an outer protective layer surrounding the optical core and the cladding layer. The cable includes an ink jet deposited alphanumeric ink layer adhered to the outer surface of the cable body. The cable includes a translucent outer layer adhered to the outer surface of the cable body over the ink layer, and the translucent outer layer includes an inner surface directly contacting the outer surface of the cable body such that the ink layer is located between the cable body and the translucent outer layer. The durometer of the material of the translucent outer layer is greater than or equal to the durometer of the material of the cable body. The coefficient of sliding friction of the material of the translucent outer layer is less than or equal to the coefficient of sliding friction of the material of the cable body. The melt temperature of the material of the translucent outer layer is less than or equal to the melt temperature of the material of the ink layer.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding and are incorporated in and constitute a part of this specification. The drawings illustrate one or more embodiment(s), and together with the description serve to explain principles and operation of the various embodiments.

BRIEF DESCRIPTION OF THE DRAWINGS

FIG. 1 is a perspective view of an optical fiber cable according to an exemplary embodiment.

FIG. 2 is a detailed perspective view of a portion of the optical fiber cable of FIG. 1 according to an exemplary embodiment.

FIG. 3 is a cross-sectional view of the optical fiber cable of FIG. 1 according to an exemplary embodiment.

FIG. 4 is a detailed cross-sectional view of a portion of the optical fiber cable of FIG. 1 according to an exemplary embodiment.

FIG. 5 is a perspective view of an optical fiber cable according to another exemplary embodiment.

FIG. 6 is a detailed perspective view of a portion of the optical fiber cable of FIG. 5 according to an exemplary embodiment.

FIG. 7 is a cross-sectional view of the optical fiber cable of FIG. 5 according to an exemplary embodiment.

FIG. 8 is a detailed cross-sectional view of a portion of the optical fiber cable of FIG. 5 according to an exemplary embodiment.

FIG. 9 is a perspective view of an optical fiber cable according to another exemplary embodiment.

FIG. 10 is a detailed perspective view of a portion of the optical fiber cable of FIG. 9 according to an exemplary embodiment.

FIG. 11 is a cross-sectional view of the optical fiber cable of FIG. 9 according to an exemplary embodiment.

FIG. 12 is a detailed cross-sectional view of a portion of the optical fiber cable of FIG. 9 according to an exemplary embodiment.

FIG. 13 is a perspective view of an optical fiber cable according to another exemplary embodiment.

FIG. 14 is a detailed perspective view of a portion of the optical fiber cable of FIG. 13 according to an exemplary embodiment.

FIG. 15 is a cross-sectional view of the optical fiber cable of FIG. 13 according to an exemplary embodiment.

FIG. 16 is a detailed cross-sectional view of a portion of the optical fiber cable of FIG. 13 according to an exemplary embodiment.

FIG. 17 is a perspective view of an optical fiber cable according to another exemplary embodiment.

FIG. 18 is a detailed perspective view of a portion of the optical fiber cable of FIG. 17 according to an exemplary embodiment.

FIG. 19 is a cross-sectional view of the optical fiber cable of FIG. 17 according to an exemplary embodiment.

FIG. 20 is a detailed cross-sectional view of a portion of the optical fiber cable of FIG. 17 according to an exemplary embodiment.

DETAILED DESCRIPTION

Referring generally to the figures, various embodiments of an optical communication cable are shown. In general, the cable embodiments disclosed herein include a surface-applied ink layer (e.g., an ink jet deposited ink layer) adhered to the outer surface of the body of the cable. To protect the surface-applied ink layer, the cable embodiments disclosed herein include a translucent outer, protective layer (e.g., a light transmitting polymer layer) that is positioned above the ink layer. The translucent outer layer protects the ink layer from being damaged, abraded or worn off during the installation or use of the cable while still allowing the user to view the ink layer.

During a hot foil printing process (a typical printing process used for many fiber optic cables), the hot foil applied ink is embedded below the outer surface of the cable body due to the heating of the ink pigment on the tap used during the hot foil printing process. In contrast to hot foil printing, a surface applied ink layer (e.g., an ink jet applied ink layer) is located on the outer surface of the cable body and thus, may be more susceptible to damage or wear during installation. The cable embodiments discussed herein including an outer translucent protective layer positioned above a surface deposited ink layer allows for the production of a cable with a wear resistant surface deposited ink layer.

Referring to FIGS. 1-4, an optical communication cable, shown as cable 10, is shown according to an exemplary embodiment. Cable 10 includes a cable body, shown as cable jacket 12, an indicia layer, shown as ink layer 14, and a translucent layer, shown as outer protective layer 16. As used herein a translucent layer may be a layer of any material that allows sufficient light transmission to allow a user to view ink layer 14 or other indicia located below the translucent layer.

Cable jacket 12 has an inner surface 18 that defines a channel or lumen 20. Generally, lumen 20 extends the length of cable jacket 12 between openings at opposing ends of cable 10. One or more optical transmission elements, shown as fiber optic ribbon 22, is located within lumen 20. In various embodiments, fiber optic ribbon 22 includes one or more optical fibers, and each optical fiber includes an optical core, a cladding layer surrounding the optical core and an outer protective layer (e.g., a polymer coating layer) surrounding the optical core and the cladding layer. In other embodiments, the optical transmission element may be one or more multi-core optical fibers. In these embodiments, multiple optical fibers (or multiple optical cores in the case of multi-core optical fibers) are located with the single lumen 20 of cable 10. In various embodiments, as shown in FIG. 3, a gap or space may be present between the outer surface of ribbon 22 and inner surface 18 which allows for the position and realignment of ribbon 22 within cable 10 as cable 10 is moved and positioned during installation or in use. In various embodiments, cable jacket 12 may have a thickness between 0.5 mm and 5.0 mm.

In general, cable 10 provides structure and protection to fiber optic ribbon 22 during and after installation (e.g., protection during handling, protection from elements, vermin, etc.). In one embodiment, cable jacket 12 is formed from a single layer of extruded polymer material (e.g., a medium-density polyethylene material), and in other embodiments, cable jacket 12 may include multiple layers of materials where the outermost layer defines the outer surface of jacket 12. Further, cable 10 may include one or more strengthening member embedded within the material of cable jacket 12. For example, cable 10 may include an elongate strengthening member (e.g., a fiber or rod) that runs the length of cable jacket 12 and that are formed from a material that is more rigid than the material of cable jacket 12. In various embodiments, the strengthening member is metal, braided steel, glass reinforced plastic, fiber glass, fiber glass yarns or other suitable material. In various embodiments, cable 10 may include other components such as steel armor and stranded and/or longitudinal strength elements. In various embodiments, cable 10 may be stranded, loose tube core cable construction or other fiber optic cable construction.

Indicia layer, shown as ink layer 14, is adhered to the outer surface 24 of cable jacket 12. As shown, ink layer 14 forms alphanumeric characters that provides information related to the cable. In various embodiments, the information may include source identifying information, measurement marks, identification regarding the optical fibers within the cable, etc. As discussed in more detail below, because the information contained in ink layer 14 may be needed prior to, during or following installation, outer protective layer 16 is structured to limit or prevent damage to ink layer 14 during or following installation.

As shown best in FIGS. 2 and 4, in the embodiment shown, ink layer 14 is a surface deposited ink layer adhered or bonded to outer surface 24 of cable jacket 12. Thus, ink layer 14 extends outward from the outer surface 24 of cable jacket 12. Generally, the outermost surface of ink layer 14 is above the outermost portion of the outer surface 24 of the cable jacket 12. In the circular cross-sectional shaped embodiment of FIGS. 1-4, the radius measured at the outermost surface of ink layer 14 is greater than the radius measured at the outermost portion of outer surface 24 of jacket 12. Thus, without protective layer 16, ink layer 14 would be the outermost layer of cable 10 and would be exposed to direct contact with surfaces and objects (e.g., the surfaces of ducts receiving cable 10) during installation and in use, and this contact would tend to abrade or wear off ink layer 14.

In one embodiment, ink layer 14 is an ink jet deposited ink layer. In such embodiments, charged ink particles are sprayed from an ink jet nozzle to form the desired indicia (e.g. alphanumeric indicia) of ink layer 14. In certain embodiments, cable jacket 12 is formed from a material (e.g., medium density polyethylene) that does not readily bond with the liquid ink jet droplets. In such embodiments, cable jacket 12 may be polarized (e.g., oxidized) by plasma treatment to create a surface promotes bonding with the ink jet droplets. The plasma treatment of the cable jacket 12 promotes wetting which in turn promotes bonding of the ink jet droplets to the surface of the cable jacket. In various embodiments, ink layer 14 is formed using solvent-based pigmented inks or UV curable pigmented inks. In other embodiments, ink layer 14 is formed through other ink deposition or printing techniques such as low indentation hot foil printing. In other embodiments, the alphanumeric characters of ink layer 14 may be formed using laser activated dyes located within cable jacket 12. In yet other embodiments, cable 10 may include a non-ink based indicia layer. For example, the indicia layer may be an etched or embossed indicia layer, a surface adhered label, or laser ablation of carbon black within cable jacket 12 and subsequent foaming of the material of cable jacket 12 to create the contrast to form indicia. In another embodiment, the characters of the indicia layer may be formed via indention in the outer surface of cable jacket 12, and the index of refraction change at the interface between outer surface 24 of cable jacket 12 and the inner surface 26 of protective layer 16 may provide additional contrast for viewing of the indented characters.

Protective layer 16 is a layer of material coupled to outer surface 24 of cable jacket 12 and is positioned over ink layer 14. As shown best in FIG. 4, ink layer 14 is located between outer surface 24 of cable jacket 12 and the inner surface 26 of protective layer 16. Thus, the inner surface of ink layer 14 contacts outer surface 24 of cable jacket 12, and the outer surface of ink layer 14 contacts inner surface 26 of protective layer 16. In the arrangement shown in FIG. 4, the outermost radius of the outer surface of ink layer 14 is less than the outermost radius of the outer surface 28 of protective layer 16. This positioning allows protective layer 16 to contact objects and surfaces during installation and thus acts to protect ink layer 14 from damage. As noted above, protective layer 16 is formed from a translucent material such that the ink layer 14 can be read or viewed through protective layer 16. In the embodiment of FIGS. 1-4, protective layer 16 surrounds the entire perimeter of cable jacket 12 such that protective layer 16 defines the outer surface of cable 10 at all positions around the perimeter of cable 10. In various embodiments, protective layer 16 is a substantially continuous material layer over ink layer 14, and in another embodiment, protective layer 16 is a porous layer or web-like layer that provides protection to ink layer 14.

In various embodiments, the sizing and/or material properties of the various layers of cable 10 are selected to provide sufficient protection for ink layer 14. In one embodiment, a thickness of ink layer 14, shown as dimension A, is between 25% and 75% of the maximum thickness of protective layer 16, shown as dimension B. In another embodiment, the thickness A of ink layer 14 is between 25% and 50% of the thickness B of protective layer 16. In various embodiments, the thickness B of protective layer 16 is between 5 micrometers and 50 micrometers, specifically between 20 micrometers and 40 micrometers, and more specifically is about 30 micrometers. In another embodiment, the thickness B of protective layer is greater than 5 micrometers. In such embodiments, the thickness A of ink layer 14 is between 0.1 micrometers and 10 micrometers, specifically between 1 micrometers and 5 micrometers, and more specifically is about 2 micrometers. Thicknesses discussed herein are generally the dimension of the layers measured in the radial dimension for the circular cross-sectional shaped cable embodiments specifically disclosed, but for embodiments having other cross-sectional shapes, the thicknesses discussed herein may generally be the dimension measured between inner and outer surfaces of the particular layer.

In various embodiments, protective layer 16 is an extruded layer that is extruded over both cable jacket 12 and ink layer 14. In such embodiments, the melt temperature of the material of protective layer 16 is less than or equal to the melt temperature of the material of ink layer 14. In various embodiments, the melt temperature of the material of protective layer 16 is between 100 degrees C. and 280 degrees C., specifically between 110 degrees C. and 170 degrees C., and more specifically is about 135 degrees C. In such embodiments, the melt temperature of the material of ink layer 14 is between 100 degrees C. and 300 degrees C., specifically between 150 degrees C. and 250 degrees C., and more specifically is about 160 degrees C. It has been found that these relative melt temperatures prevent smearing or distortion of ink layer 14 that may otherwise be caused by the extrusion of protective layer 16 over ink layer 14. In one embodiment, ink layer 14 may be formed from a white, titanium oxide based ink.

Further, the hardness of the material of each layer of cable 10 may be selected to provide increased wear protection for ink layer 14. In one embodiment, the durometer of the material of protective layer 16 is greater than or equal to the durometer of the material of cable jacket 12. In various embodiments, the hardness of the material of protective layer 16 is between 100% and 150%, specifically between 110% and 140%, and more specifically is about 120% of the hardness of the material of cable jacket 12. In these embodiments, because of the increased hardness of protective layer 16, protective layer 16 acts to protect ink layer 14 through abrasion resistance. Further because of the higher hardness provided by protective layer 16, protective layer 16 may also function to increase the tensile strength of cable 10.

In other embodiments, protective layer 16 may be a sacrificial layer designed to abrade or wear off during installation, but to have sufficient thickness that protective layer 16 is abraded while leaving ink layer 14 intact. In such embodiments, the hardness of the material of protective layer 16 may be substantially equal to the hardness of the material of cable jacket 12.

In various embodiments, the material of protective layer 16 is selected to provide functionality in addition to the protection of ink layer 14. In one such embodiment, the material of protective layer 16 has a coefficient of sliding friction that is less than or equal to the coefficient of sliding friction of the material of cable jacket 12. In this embodiment, protective layer 16 facilitates installation by allowing cable 10 to slide more easily over objects and surfaces (e.g., as cable 10 is pulled through duct or conduit). In various embodiments, the coefficient of sliding friction of the material of protective layer 16 is between 65% and 95%, specifically between 70% and 90%, and more specifically is about 85% of the coefficient of sliding friction of cable jacket 12.

In various embodiments, protective layer 16 is coupled directly to outer surface 24 of cable jacket 12. In certain embodiments, protective layer 16 is coupled directly to outer surface 24 of cable jacket 12 without an intervening layer of adhesive. In certain embodiments, protective layer 16 is formed from a material that is compatible with the material of cable jacket 12 such that protective layer 16 bonds directly to cable jacket 12. In certain embodiments, protective layer 16 is bonded to cable jacket 12 via molecular entanglement of the material of protective layer 16 with the material of cable jacket 12. The molecular entanglement may be created by the application heat and/or pressure applied to cable 10 following or during application of protective layer 16. In other embodiments, protective layer 16 is bonded to cable jacket 12 via other bonding structures such as mechanical interlocking structures and/or chemical bonding.

In various embodiments, cable jacket 12 and protective layer 16 are both formed from compatible thermoplastic materials. In a specific embodiment, the material of cable jacket 12 is a medium-density polyethylene based material, and the material of protective layer 16 is a high-density polyethylene material. In such embodiments, the medium-density polyethylene of the cable jacket has a density that is less than the density of the high-density polyethylene material of the protective layer. In various embodiments, the density of the medium-density polyethylene of the cable jacket is between 80% and 99% of the density of the higher-density polyethylene material of protective layer 16.

In various embodiments, a wide variety of materials and formation techniques can be used to form cable jacket 12 and/or protective layer 16. For example, protective layer 16 may be a thermoplastic or thermoset material that may be applied to cable jacket 12 using a variety of processes including extrusion, electrostatic powder coating, film application with melting, hot melt swirl coating, hot melt slot coating, etc. Protective layer 16 may be a UV curable film applied over ink layer 14, and protective layer 16 may also be applied by a solvent based coating method. In another embodiment, protective layer 16 is formed from a laser transparent material that will transmit laser energy to the surface of cable jacket 12 beneath the protective layer to allow the formation an indicia layer beneath protective layer 16. In other embodiments, protective layer 16 may be applied to cable jacket 12 via an aerosol application or through a tape transfer application.

In various embodiments, cable jacket 12 may be a variety of materials used in cable manufacturing such as polyvinyl chloride (PVC), polyvinylidene difluoride (PVDF), nylon, polyester or polycarbonate and their copolymers. In addition, the material of cable jacket 12 may include small quantities of other materials or fillers that provide different properties to the material of cable jacket 12. For example, the material of cable jacket 12 may include materials that provide for coloring, UV/light blocking (e.g., carbon black), burn resistance, etc.

Referring to FIGS. 5-8, an optical communication cable 50 is shown according to an exemplary embodiment. Cable 50 is substantially the same as cable 10 except that cable 50 includes a protective layer 52 that extends partially around the perimeter of cable jacket 12. As shown best in FIG. 8, protective layer 52 has a left lateral portion 54 and a right lateral portion 56 that extend beyond the left and right lateral edges of ink layer 14 respectively.

Protective layer 52 has a length L, which is the length of the outer surface of protective layer 52 extending between the outer most edges of lateral portions 54 and 56. The length L is less than the length of the perimeter of cable jacket 12, but is greater than the length of ink layer 14. This sizing of protective layer 52 provides for a protective layer above ink layer 14 while not requiring use of the protective material around the entire perimeter of cable 50. In addition, the transition between protective layer 52 (e.g., the substantially radial surfaces forming the left and right faces of lateral portions 54 and 56 in FIG. 8) provide a tactile identifying feature that identifies the location of ink layer 14. Identifying ink layer 14 with a tactile feature may assist during installation or repair by allowing the user to identify the location of ink layer 14 by touch allowing the user to more easily/efficiently reorient the cable to view ink layer 14. This can be particularly useful when working with an installed cable in tightly packed, confined and/or poorly lit areas.

In various embodiments, the length L of protective layer is between 3 mm and 5 mm In other embodiments, length L is between 105% and 150% of the length of ink layer 14 (i.e., the length of the outer surface of ink layer 14 between the opposing lateral edges edges of ink layer 14), and more specifically length L is between 110% and 130% of the length of ink layer 14.

Referring to FIGS. 9-12, an optical communication cable 60 is shown according to an exemplary embodiment. Cable 60 is substantially the same as cable 50 except that cable 60 includes a surface channel or recess 62 formed in outer surface 24. Recess 62 is a depression formed in cable jacket 12 such that the outer surface 66 of cable jacket 12 within recess 62 is located below outer surface 24 of cable jacket 12 outside of the recess 62. Ink layer 14 is positioned on outer surface 66 of recess 62, and ink layer 14 has a thickness A less than the depth D of recess 62 such that the outermost surface of ink layer 14 is recessed below outer surface 24 of cable jacket 12 outside of the recess 62. Protective layer 64 is formed within and fills in recess 62 to provide protection to ink layer 14.

In this embodiment, recess 62 has a depth D (i.e., the radial distance measured between the outer surface at the recess and the outer surface of the cable jacket adjacent the recess) that substantially matches the thickness of protective layer 64. Thus, the outer most radius of cable 10 at protective layer 64 is substantially the same as the radius of the outer surface 24 of cable jacket 12 outside of recess 62. This relative sizing results in an outer surface of protective layer 64 that is substantially contiguous with outer surface 24 adjacent to recess 62. In this embodiment, protective layer 64 provides protection to ink layer 14 as discussed above while providing a cable with a constant outer radius. However, in other embodiments, protective layer 64 has a thickness greater than depth D such that the outer surface of protective layer 64 extends beyond the outer surface of the cable jacket.

Referring to FIGS. 13-16, an optical communication cable 70 is shown according to an exemplary embodiment. Cable 70 is substantially the same as cable 50 except that protective layer 72 of cable 70 has thickness that varies at different positions along the length L1 of layer 72. As shown L1 is the distance (or width) of protective layer 72 between lateral edges 74 and 76. Protective layer 72 has its maximum thickness at its midpoint between left lateral edge 74 and right lateral edge 76, and the thickness decreases or tapers from the midpoint to both lateral edges 74 and 76. As shown, protective layer 72 has a convex outer surface 78. In one embodiment, the material of protective layer 72 is selected such that the convex shape of protective layer 72 acts to magnify ink layer 14 located between protective layer 72. In the embodiment shown, the radius of curvature of outer surface 78 is less than the radius of curvature of outer surface 24 of cable jacket 12. In various embodiments, the outer surface 78 of protective layer 72 has a length (e.g., the arc length along of surface 78 extending between lateral edges 74 and 76). In various embodiments, the length of outer surface 78 is between 101% to 110% of the width, L1 of protective layer, and protective layer 72 may have a maximum thickness C that is between 2 times and 10 times the thickness A of ink layer 14.

In one embodiment, a thickness of ink layer 14, shown as dimension A, is between 25% and 75% of a thickness of protective layer 72 at its midpoint, shown as dimension C.

In another embodiment, the thickness A of ink layer 14 is between 25% and 50% of the thickness C of protective layer 72. In various embodiments, the thickness C of protective layer 72 is between 10 micrometers and 50 micrometers, specifically between 20 micrometers and 40 micrometers, and more specifically is about 30 micrometers.

Referring to FIGS. 17-20, an optical communication cable 70 is shown according to an exemplary embodiment. Cable 80 is substantially the same as cable 70 except that protective layer 82 of cable 80 includes a pair of lateral projections, shown as buttresses 84 and 86. Buttresses 84 and 86 are projections or ridges that extend the length of and on either side of central portion 88 of protective layer 82. Central portion 88 is shaped like protective layer 72 discussed above and may provide for magnification similar to protective layer 72. Buttresses 84 and 86 provide extra protection at the edges of ink layer 14 and may act to compensate for the lower thickness of central portion 88 at its lateral edges. Buttresses 84 and 86 may also provide a tactile identifying feature that identifies the location of ink layer 14. Identifying ink layer 14 with a tactile feature may assist during installation or repair by allowing the user to identify the location of ink layer 14 by touch allowing the user to more easily/efficiently reorient the cable to view ink layer 14. This can be particularly useful when working with an installed cable in tightly packed, confined and/or poorly lit areas.

In one embodiment, buttresses 84 and 86 are formed from the same material as central portion 88. In this embodiment, buttresses 84 and 86 may be extruded onto cable jacket 12 along with central portion 88. In another embodiment, buttresses 84 and 86 are formed from a material different from the material of central portion 88. In one such embodiment, buttresses 84 and 86 are formed from the material of cable jacket 12.

While the specific cable embodiments discussed herein and shown in the figures relate primarily to cables that have a substantially circular cross-sectional shape defining substantially cylindrical internal lumens, in other embodiments, the cables discussed herein may have any number of cross-section shapes. For example, in various embodiments, cable jacket 12 may have a square, rectangular, triangular or other polygonal cross-sectional shape. In such embodiments, the passage or lumen of the cable may be the same shape or different shape than the shape of cable jacket 12. In some embodiments, cable jacket 12 may define more than channels or passages. In such embodiments, the multiple channels may be of the same size and shape as each other or may each have different sizes or shapes.

The optical fibers discussed herein may be flexible, transparent optical fibers made of glass or plastic. The fibers may function as a waveguide to transmit light between the two ends of the optical fiber. Optical fibers may include a transparent core surrounded by a transparent cladding material with a lower index of refraction. Light may be kept in the core by total internal reflection. Glass optical fibers may comprise silica, but some other materials such as fluorozirconate, fluoroaluminate, and chalcogenide glasses, as well as crystalline materials, such as sapphire, may be used. The light may be guided down the core of the optical fibers by an optical cladding with a lower refractive index that traps light in the core through total internal reflection. The cladding may be coated by a buffer and/or another coating(s) that protects it from moisture and/or physical damage. These coatings may be UV-cured urethane acrylate composite materials applied to the outside of the optical fiber during the drawing process. The coatings may protect the strands of glass fiber.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that any particular order be inferred.

It will be apparent to those skilled in the art that various modifications and variations can be made without departing from the spirit or scope of the disclosed embodiments. Since modifications combinations, sub-combinations and variations of the disclosed embodiments incorporating the spirit and substance of the embodiments may occur to persons skilled in the art, the disclosed embodiments should be construed to include everything within the scope of the appended claims and their equivalents.

What is claimed is:

1. An optical communication cable comprising:
   an outer cable jacket including an outer surface, an inner surface and a channel defined by the inner surface;
   an optical transmission element located in the channel, wherein the channel is sized such that a space is located between an outer surface of the optical transmission element and the inner surface of the cable jacket;
   an ink layer positioned on the outer surface of the cable jacket, the ink layer formed from ink droplets adhered to the outer surface of the cable jacket; and
   a translucent layer coupled to the outer surface of the cable jacket over the ink layer, such that the ink layer is located between the outer surface of the cable jacket and an inner surface of the translucent layer, wherein the translucent layer defines the outermost surface of the cable at the location of the ink layer.

2. The optical communication cable of claim 1, wherein a thickness of the ink layer is between 25% and 75% of a thickness of the translucent layer.

3. The optical communication cable of claim 2, wherein the thickness of the ink layer is between 0.1 micrometers and 10 micrometers and the thickness of the translucent layer is between 5 micrometers and 50 micrometers, wherein a thickness of the cable jacket between the inner surface and the outer surface is between 0.5 mm and 5 mm.

4. The optical communication cable of claim 1, wherein the cable jacket is formed from a polyethylene material having a first density and the translucent layer is formed from a polyethylene material having a second density, wherein the first density is less than the second density, wherein the translucent layer is bonded to the cable jacket via molecular entanglement between the materials of the cable jacket and the translucent layer.

5. The optical communication cable of claim 1, wherein an outermost surface of the ink layer is above an outermost portion of the outer surface of the cable jacket.

6. The optical communication cable of claim 5, wherein the translucent layer surrounds the entire perimeter of the cable jacket, wherein the cable jacket is formed from a single layer of extruded polymer material.

7. The optical communication cable of claim 5, wherein the translucent layer is a continuous layer that extends the entire axial length of the cable jacket.

8. The optical communication cable of claim 5, wherein the translucent layer includes a first lateral edge and a second lateral edge and a width extending between the first and second lateral edges, wherein the width of the translucent layer is less than the length of the perimeter of the cable jacket such that the first and second lateral edges of the translucent layer are bonded to the outer surface of the cable jacket.

9. The optical communication cable of claim 1, wherein the outer surface of the cable jacket includes a recess extending longitudinally along the outer surface of the cable jacket, the recess shaped such that the outer surface of the cable jacket at the recess is below the outer surface of the cable jacket outside of the recess, wherein the ink layer comprises multiple alphanumeric characters, wherein the multiple alphanumeric characters of the ink layer are all positioned on the outer surface within the same recess.

10. An optical cable comprising:
a cable body including an outer surface;
an optical transmission element located within the cable body, the optical transmission element including an optical core, a cladding layer surrounding the optical core and an outer protective layer surrounding the optical core and the cladding layer;
an indicia layer positioned on the outer surface of the cable body; and
a translucent outer layer coupled to the outer surface of the cable body over the indicia layer, wherein the translucent outer layer includes an inner surface directly contacting the outer surface of the cable body and the translucent outer layer is bonded to the outer surface of the cable body via a bond between the material of the cable body and the material of the translucent outer layer at the interface between the outer surface of the cable body and the inner surface of the translucent outer layer, wherein the indicia layer is located between the cable body and the translucent outer layer, wherein the translucent outer layer defines the outermost surface of the cable at the location of the ink layer;
wherein the hardness of the material of the translucent outer layer is greater than or equal to the hardness of the material of the cable body;
wherein a thickness of the translucent outer layer is less than a thickness of the cable body.

11. The optical cable of claim 10, wherein the cable body is formed from a polyethylene material having a first density and the translucent outer layer is formed from a polyethylene material having a second density, wherein the first density is less than the second density, wherein the bond is molecular entanglement between the material of the cable body and the material of the translucent outer layer, wherein the thickness of the translucent layer is between 0.1% and 10% of the thickness of the cable body.

12. The optical cable of claim 10, wherein the hardness of the material of the translucent outer layer is between 100% and 150% of the hardness of the material of the cable body.

13. The optical cable of claim 10, wherein the coefficient of sliding friction of the material of the translucent outer layer is between 65% and 95% of the coefficient of sliding friction of the material of the cable body.

14. The optical cable of claim 10, wherein the length of the indicia layer between opposing edges of the indicia layer is between 3 mm and 5 mm, wherein the length of the translucent outer layer between opposing edges of the translucent outer layer is greater than the length of the indicia layer.

15. An optical fiber cable comprising:
a cable body including an outer surface, an inner surface, a first end, a second end opposite the first end and a lumen defined by the inner surface extending between the first end and the second end;
a plurality of optical fibers in the lumen, each optical fiber including an optical core, a cladding layer surrounding the optical core and an outer protective layer surrounding the optical core and the cladding layer;
an ink jet deposited alphanumeric ink layer comprising charged ink particles adhered to the outer surface of the cable body; and
a translucent outer layer adhered to the outer surface of the cable body over the ink layer, wherein the translucent outer layer includes an inner surface directly contacting the outer surface of the cable body, wherein the ink layer is located between the cable body and the translucent outer layer, wherein the translucent outer layer defines the outermost surface of the cable at the location of the ink layer;
wherein the hardness of the material of the translucent outer layer is greater than or equal to the hardness of the material of the cable body, wherein the coefficient of sliding friction of the material of the translucent outer layer is less than or equal to the coefficient of sliding friction of the material of the cable body, wherein the melt temperature of the material of the translucent outer layer is less than or equal to the melt temperature of the material of the ink layer.

16. The optical fiber cable of claim 15, wherein the outer surface of the cable body is polarized and the charged ink particles of the ink layer bond to the outer surface of the cable body.

17. The optical fiber cable of claim 15, where in the melt temperature of the material of the translucent outer layer is between 100 degrees C. and 280 degrees C. and the melt temperature of the material of the ink layer is between 100 degrees C. and 300 degrees C.

18. The optical fiber cable of claim 15, wherein a thickness of the ink layer is between 25% and 75% of a thickness of the translucent layer, wherein the thickness of the translucent layer is between 20 micrometers and 40 micrometers.

19. The optical fiber cable of claim 15, wherein the cable body is formed from a polyethylene material and the translucent outer layer is formed from a polyethylene material.

20. The optical fiber cable of claim 19, wherein the hardness of the material of the translucent outer layer is between 100% and 150% of the hardness of the material of the cable body.

* * * * *